US006220814B1

(12) United States Patent
Brushwood et al.

(10) Patent No.: US 6,220,814 B1
(45) Date of Patent: Apr. 24, 2001

(54) TURBINE INTERSTAGE SEALING ARRANGEMENT

(75) Inventors: John S. Brushwood; Raymond E. Chupp, both of Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/116,634

(22) Filed: Jul. 16, 1998

(51) Int. Cl.[7] ................................................. F01D 25/10
(52) U.S. Cl. ............................... 415/47; 415/48; 219/544; 219/477; 219/201; 277/930
(58) Field of Search .................. 415/47, 48, 175, 415/177, 178, 174.5, 174.2, 174.1, 136, 173.2, 173.5, 173.3; 277/930, 413, 421; 219/544, 476, 477, 478, 201, 200

(56) References Cited

U.S. PATENT DOCUMENTS

| 3,829,233 | 8/1974 | Scalzo et al. . |
| 5,217,232 | * 6/1993 | Makhobey ............................ 277/26 |
| 5,401,036 | 3/1995 | Basu ...................................... 277/53 |
| 5,613,829 | 3/1997 | Wolfe et al. ...................... 415/174.1 |
| 5,667,358 | 9/1997 | Gaul . |
| 5,749,584 | * 5/1998 | Skinner et al. ....................... 277/53 |

FOREIGN PATENT DOCUMENTS

| 3901167 A1 | 7/1990 | (DE) . |
| 0 816 726 | 1/1998 | (EP) . |
| 2 103 718 | 2/1983 | (GB) . |

OTHER PUBLICATIONS

Chupp et al., Brush Seal Development for Large Industrial Gas Turbines, pp. 1–8 Am. Inst. Of Aeronautics & Astronautics.

* cited by examiner

Primary Examiner—Edward K. Look
Assistant Examiner—Rhonda Barton
(74) Attorney, Agent, or Firm—Eckert Seamans Cherin & Mellott, LLC

(57) ABSTRACT

A gas turbine sealing arrangement which includes a seal housing having at least one seal in close proximity to the turbine rotor. The seal housing is preheated prior to turbine start-up to thermally move the seal housing and its seal radially away from the rotor.

12 Claims, 4 Drawing Sheets

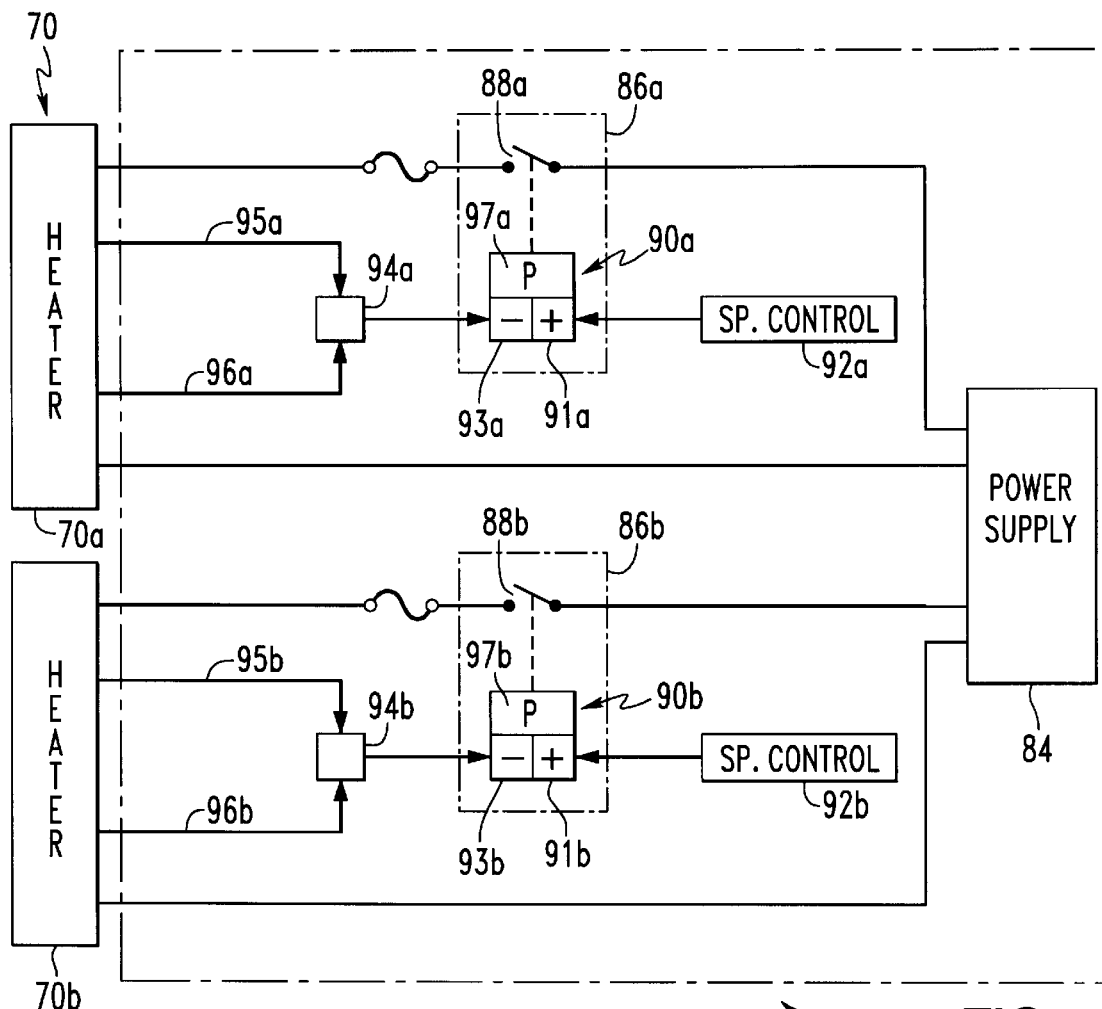
FIG. 5
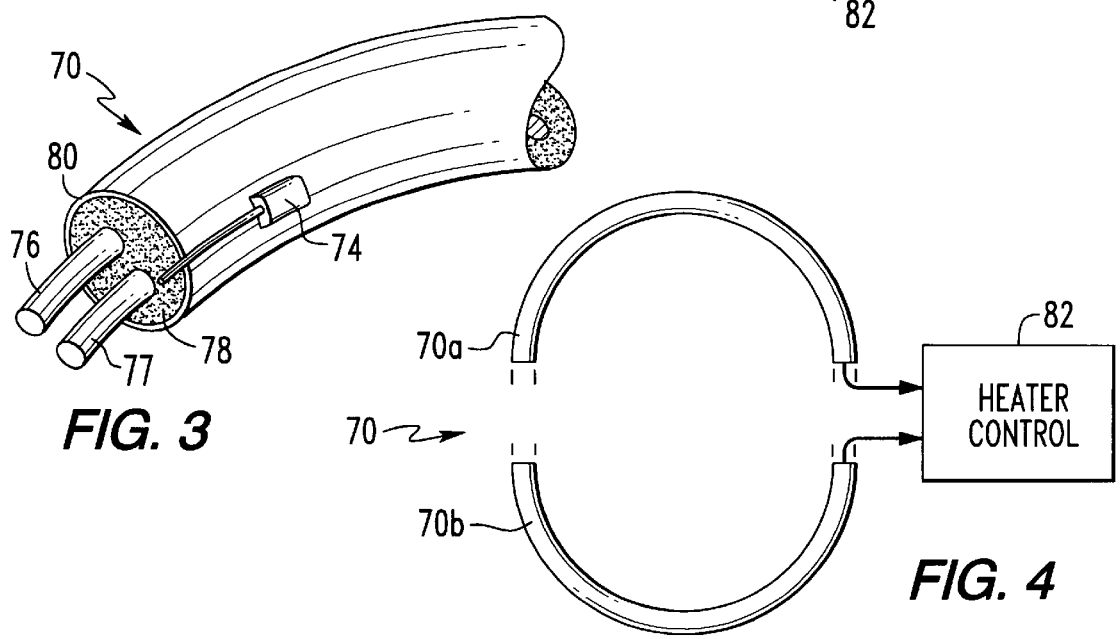
FIG. 3
FIG. 4

TURBINE INTERSTAGE SEALING ARRANGEMENT

BACKGROUND OF THE INVENTION

1. Field of the invention

The invention in general relates to multistage rotating machinery and more particularly to an arrangement for protecting the seals normally provided between stages and for establishing improved interstage leakage control.

2. Description of related art

In various multistage rotating machines used for energy conversion, such as turbines, a fluid is used to produce rotational motion. In a turbine stage, high pressure-low velocity fluid is expanded through stationary nozzles, or vanes, producing a lower pressure-higher velocity jet which is directed onto the blades of a rotor assembly causing rotation thereof. The turbine is constituted by a plurality of such stages and in each stage the kinetic energy of the fluid is converted into rotational kinetic energy of the rotor assembly.

Any fluid leakage between stages reduces turbine performance and efficiency and, therefore, annular interstage seals in seal housings, are provided to reduce such leakage. In general, flow leakage is reduced when the gap between the seal and rotating rotor is minimized. During turbine start-up the rotor assembly expands radially and may actually contact the seal, causing deformation thereof. In order to prevent this unwanted contact from occurring, the seal housing is built a sufficient distance from the rotor assembly so as to allow for this initial expansion of the rotor assembly. However, at steady state operation, due to the initial positioning of the seal housing, the distance between the seal and rotor assembly is not optimal, thus reducing turbine performance.

The present invention provides an arrangement whereby the seals may be located closer to the rotor assembly during steady state operation, to minimize fluid bypass and to therefore increase overall efficiency.

SUMMARY OF THE INVENTION

An interstage sealing arrangement for a multistage turbine is provided and includes a seal housing connected to a stationary portion of the turbine. The seal housing contains at least one seal, normally in close proximity to a rotor assembly of the turbine. A heating means is provided in thermal contact with the seal housing and is operable, when supplied with electrical energy, to heat the seal housing, causing it to move radially, along with its seal, at least prior to the start-up period of the turbine.

BRIEF DESCRIPTION OF THE DRAWINGS

FIG. 3 illustrates a heater element which may be used in the practice of the present invention.

FIG. 4 is a schematic of a heating system for the turbine of FIG. 1.

FIG. 5 is a block diagram of a heater control for the system of FIG. 4.

DESCRIPTION OF THE PREFERRED EMBODIMENT

Figure 1:
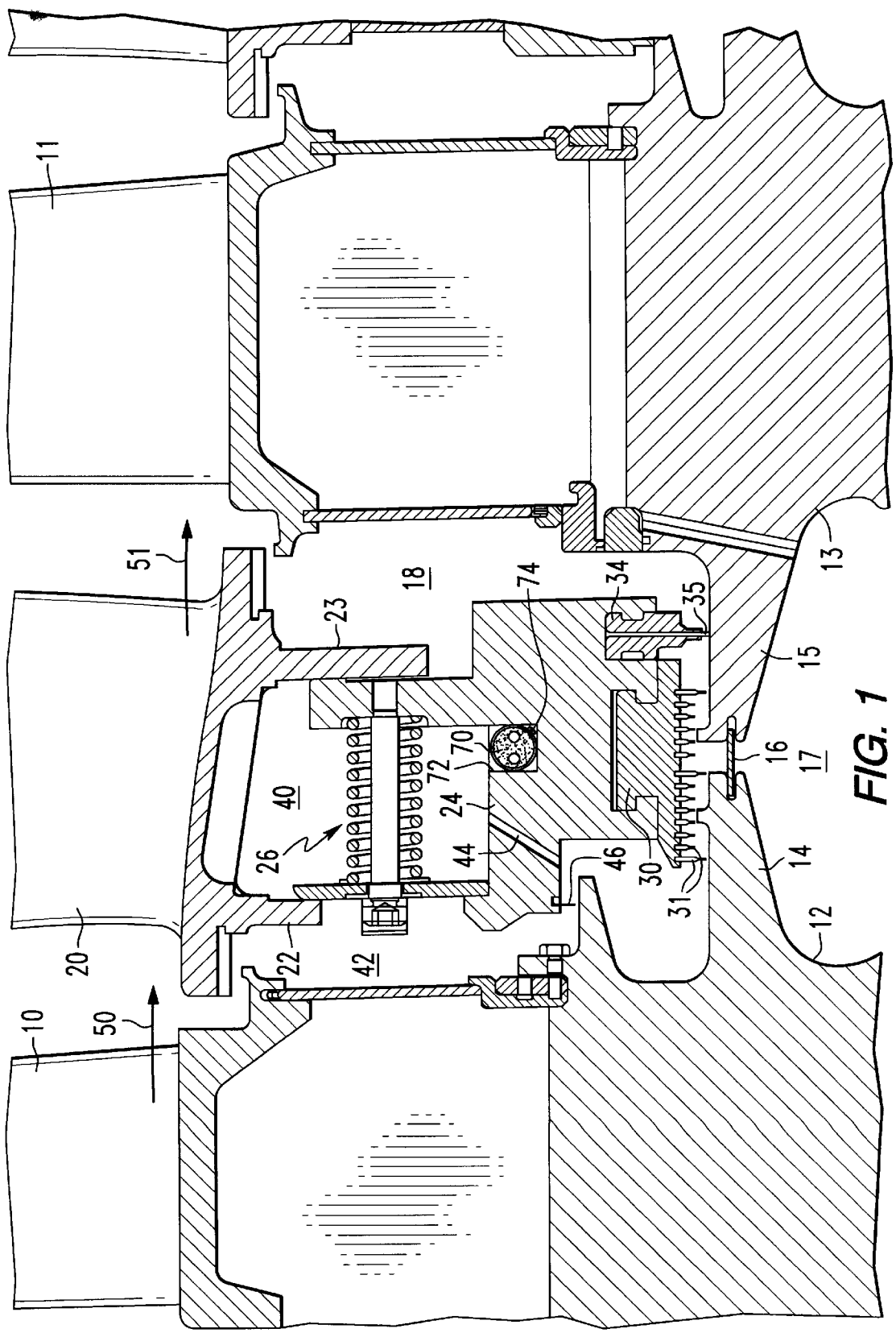
FIG. 1 is an axial sectional view of a portion of a gas turbine.

In the drawings, which are not necessarily to scale, like or corresponding parts are denoted by like or corresponding reference numerals.

Although the present invention is applicable to a variety of rotating machinery, it will be described with respect to a turbine, more particularly, to a gas turbine, a portion of which is illustrated in FIG. 1.

FIG. 1 shows two turbine blades 10 and 11 connected to respective rotor disks 12 and 13 of a rotor assembly, and each having a respective disk arm 14 and 15. An annular band 16 mates with disk arms 14 and 15 and serves to minimize rotor cooling gas in cavity 17 from passing into disk cavity 18.

A vane 20 is connected to the stationary portion of the turbine and includes a front annular flange 22 and a back annular flange 23, between which is positioned a seal housing 24. The seal housing 24 is maintained in position between flanges 22 and 23 by means of an adjustable spring-loaded locating mechanism 26 which allows the seal housing 24 to grow thermally, independently of the vane assembly.

Seal housing 24 includes at least one seal such as labyrinth seal 30 having a plurality of fingers 31 extending toward the disk arms 14 and 15. In addition, FIG. 1 also shows another type of seal, a brush seal 34 having bristles 35 which can contact the disk arm 15 to aid in minimizing upstream to downstream gas flow (from left to right in FIG. 1) through the seal.

Cooling gas is also provided, via internal passages in vanes 20, to annular chamber 40 above the seal housing 24 and this gas passes between flanges 22 and 23 and the seal housing 24 into back disk cavity 18, as well as front disk cavity 42. In addition, the cooling gas from chamber 40 is directed into the volume to the left of seal 30 by means of gas passageway 44 in seal housing 24. A portion of this gas also finds its way into disk cavity 42 via a knife seal 46.

The gas in disk cavities 18 and 42 not only helps in cooling the base of the turbine blades 10 and 11, but also functions to balance against the pressure of hot gas driving the turbine blades, and represented by arrows 50 and 51. That is, the hot gas is prevented from entering the disk cavities 18 and 42 by means of the pressure conditions established. If the seals are worn or are otherwise too far away from the rotor assembly, as represented by disk arms 14 and 15, then the cooling gas requirements would become excessively large, thus reducing the overall efficiency of the turbine.

Figure 2:
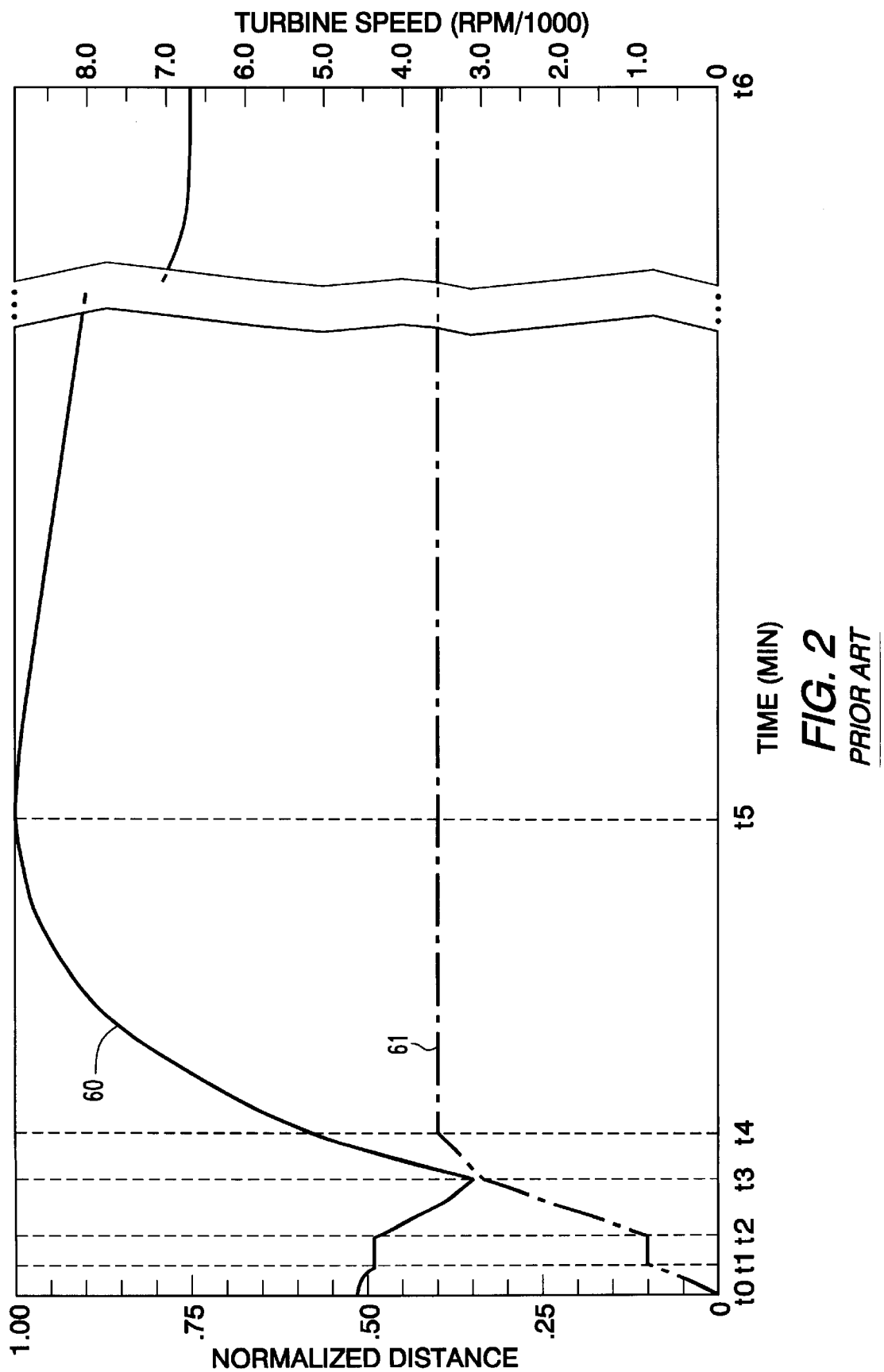
FIG. 2 is a curve illustrating the start-up cycle of a typical gas turbine interstage location.

By way of example, and with additional reference to FIG. 2, there is illustrated a start-up cycle for a typical turbine interstage location such as illustrated in FIG. 1. Time is plotted on the horizontal axis, normalized seal-to-rotor distance (i.e. seal tip-to-disk arm), represented by curve 60, is plotted on the left vertical axis and turbine speed, represented by curve 61, is plotted on the right vertical axis. The curve is plotted for a labyrinth seal, although a brush seal would be similar, except that the clearances would be smaller.

Various speed profiles may be followed and by way of one example, the turbine is started at time t0 and increases in speed up to time ti where it is held constant from t1 to t2. During the time from t0 to t1 the rotor assembly increases in diameter by centrifugal force and so the seal-to-rotor distance correspondingly decreases and then levels out for time t1 to t2. During a second speed ramp from t2 to t3, the rotor continues to grow and a maximum closure (minimum clearance) is experienced at time t3. From time t3 and as the turbine reaches steady state speed, at time t4, the seal housing is starting to expand due to heating effects, thereby increasing the seal-to-rotor spacing.

At time t5, the seal housing has moved to its maximum radial position (normalized to a value of 1) and as the rotor continues to grow by thermal action, the spacing between them continues to decrease until a steady state condition is reached at time t6 wherein the seal-to-rotor distance is approximately 0.75 (compared to a maximum of 1 at time t5 and a minimum of about 0.33 at time t3). A much improved sealing function could be achieved if this steady state distance between the seal housing and rotor were smaller. However, if the initial cold build distance between the seal housing and rotor assembly is made smaller, then there is a danger that the seal will actually contact the rotor assembly at t3, as the rotor assembly initially grows, and be damaged thereby. The present invention obviates this potential damage situation and allows for a smaller clearance during steady state operation.

With reference once again to FIG. 1, the present invention, in effect, radially moves the seal housing 24, along with its seals 30 and 34, away from the rotor assembly prior to turbine start-up. This is accomplished with the provision of a heating means which causes thermal expansion, and a corresponding radial movement of the seal housing 24. More particularly, a heater cable 70 is positioned in thermal contact with the seal housing 24, and when supplied with electric energy causes the seal housing to grow radially.

In the embodiment of FIG. 1 the heater cable 70 is positioned within a circumferential groove 72 machined into the seal housing 24 and held in place by means of a thermally conductive adhesive, for example. In order to obtain an indication of the temperature condition of the seal housing the arrangement includes one or more temperature sensors 74 which may be connected to the heater cable 70.

FIG. 3 illustrates a commercially available heater cable which includes heating elements 76 and 77 contained within a magnesium oxide insulation 78 and surrounded by an alloy sheath 80. Temperature sensor 74 is affixed to the outside of sheath 80. The cable is fabricated to a desired curvature to match that of groove 72, or if flexible enough, the cable may be bent as inserted.

With a seal housing 24 in two arcuate 180° sections, the heater cable 70 may also be in two arcuate 180° sections, 70a and 70b, as illustrated in FIG. 4. The heater cable sections 70a and 70b are electrically connected to a heater control system 82, which may also supply electrical energy to the cable, as further illustrated in FIG. 5, to which reference is now made.

In FIG. 5, a power supply supplies electrical energy to the heater cable 70, i.e., to the two halves 70a and 70b, via respective thermostats 86a and 86b which control respective line switches 88a and 88b.

The opening and closing of switch 88a is governed by a controller 90a having a positive input 91a for receiving, from setpoint control 92a, a voltage indicative of a desired heater temperature. A negative input 93a receives an indication of present heater temperature via decision circuit 94a. In the embodiment of FIG. 5 two spaced-apart temperature sensors are utilized to generate signals indicative of heater temperature values. These signals are provided, via electric leads 95a and 96a, to decision circuit 94a, which may then pick the higher value or lower value, if there is one, or may output some average of the two signals.

The difference between the signals applied to inputs 91a and 93a is provided to proportional circuit 97a of controller 90a, and when the signals are equal or within some predetermined threshold of one another, indicating the desired temperature has been reached, the proportional circuit 97a will cause switch 88a to open.

The operation described above with respect to thermostat 86a is equally applicable to the operation of thermostat 86b for governing electrical energy supplied to heater 70b.

Figure 6:
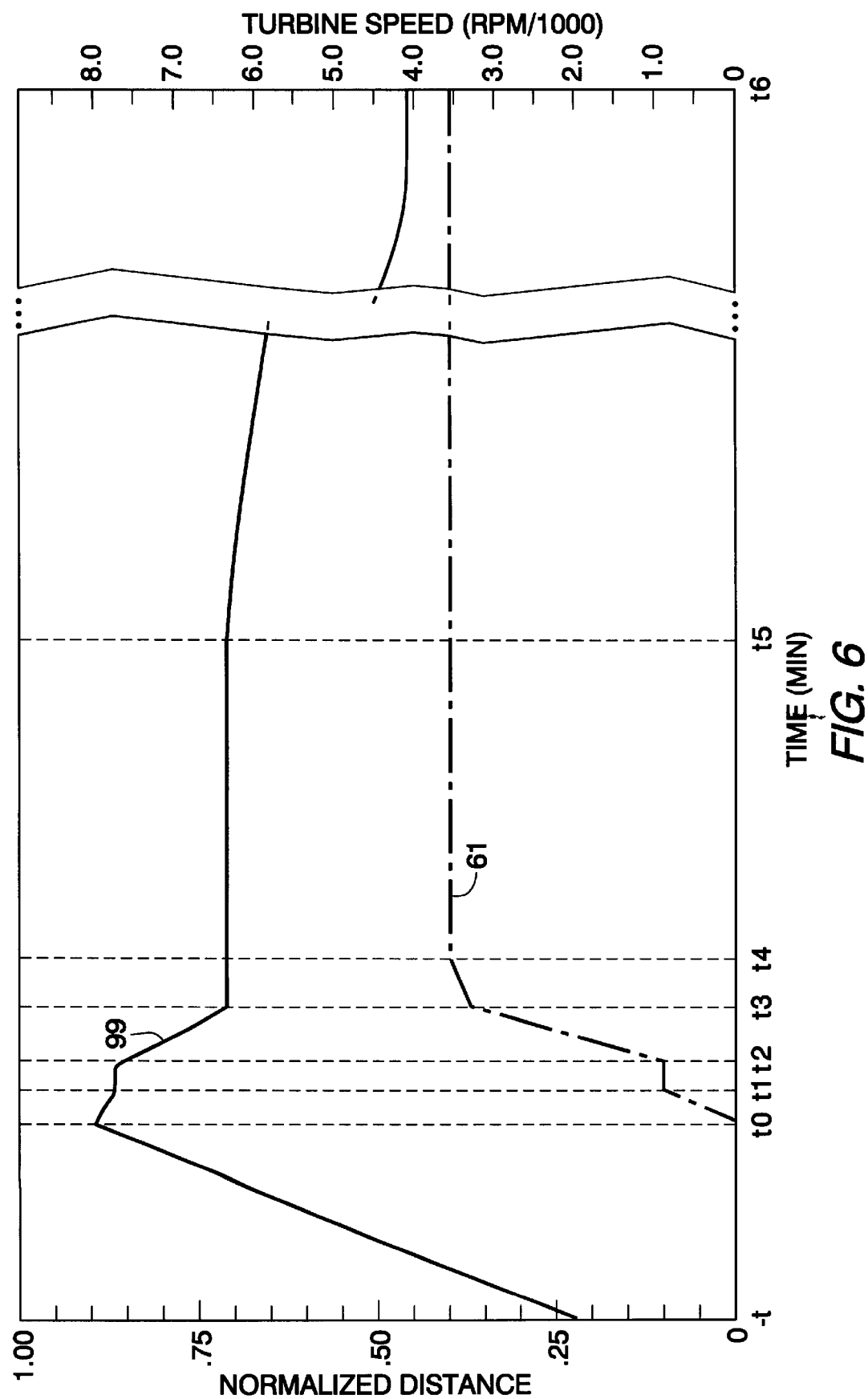
FIG. 6 is a curve illustrating the start-up cycle of a gas turbine interstage location in accordance with the present invention.

FIG. 6 illustrates the start-up cycle for the turbine interstage location, incorporating the present invention. The axes, as well as the turbine speed curve 61 are the same as that shown in FIG. 2. The seal clearance curve 99, however is quite different from its counterpart curve 60 in FIG. 1.

More particularly, prior to normal turbine start-up which is at time t0, the seal heater 70 is energized at some time −t which causes thermal expansion of the seal housing 24 and movement, together with its seals, away from the rotor assembly so that at actual turbine start-up at time t0, the seal clearance is already at a value of about 0.89. It will not reach the maximum value of 1, as was the case in FIG. 2, since it is initially cold built closer to the rotor. During the first speed ramp from t0 to t1 the rotor assembly grows by centrifugal force reducing the clearance. The clearance is further reduced during the second speed ramp from t2 to t3 and after the turbine has reached steady state speed at time t4 thermal growth of the rotor assembly causes steady closure until time t6 where steady state clearance is established at around 0.46, significantly less than the prior art value of 0.75, shown in FIG. 2. For a brush seal, the steady state closure is even greater.

Thus with the present invention the seal may initially be placed closer to the rotor assembly since it is thermally moved away prior to initial turbine start-up. If a conventional seal housing was built with an initial large seal-to-rotor clearance at time t0, it would thermally grow during the start-up process and end up at steady state with an objectionably large clearance. Conversely, if the seal housing were initially placed closer to the rotor assembly, the seal(s) may experience damage due to rotor assembly growth during the start-up process.

Although the present invention has been described with a certain degree of particularity, it is to be understood that various substitutions and modifications may be made without departing from the spirit and scope of the invention as defined in the appended claims. By way of example, if desired, the heater may also be put into operation during a turbine shut-down process to move or keep the seals away from the rotor during the latter part of such shut-down process.

What is claimed is:

1. An interstage sealing arrangement for a turbine having a stationary portion, a rotor assembly and a plurality of stages, comprising:

(A) a seal housing connected to said stationary portion of said turbine in a manner that permits the seal housing to grow thermally, independently of said stationary portion of said turbine;

(B) at least one seal carried by said seal housing in close proximity to said rotor assembly; and (C) heating means in direct thermal contact with said seal housing extending substantially circumferentially around said seal housing and operable to heat said seal housing to cause it to move radially, along with said seal, independent of rotation of the rotor and at least during a time prior to start-up of said turbine.

2. An interstage sealing arrangement for a turbine having a stationary portion, a rotor assembly and a plurality of stages, comprising:
   (A) a seal housing connected to said stationary portion of said turbine in a manner that permits the seal housing to grow thermally, independently of said stationary portion of said turbine;
   (B) at least one seal carried by said seal housing in close proximity to said rotor assembly;
   (C) heating means in direct thermal contact with said seal housing and operable to heat said seal housing to cause it to move radially, along with said seal, at least during a time prior to start-up of said turbine; and
   wherein said heating means is constituted by at least one heater cable extending substantially circumferentially around said seal housing.

3. An arrangement according to claim 2 wherein:
   (A) said heating means is comprised of two arcuate 180° heater cable sections.

4. An arrangement according to claim 2 wherein:
   (A) said seal housing includes a circumferential groove;
   (B) said heater cable being positioned within said groove.

5. An arrangement according to claim 1 which includes at least one temperature sensor positioned to obtain an indication of the temperature of said seal housing.

6. An arrangement according to claim 5 wherein said temperature sensor is in contact with said heating means.

7. An arrangement according to claim 5 which includes:
   (A) a heater control system for governing operation of said heating means.

8. An arrangement according to claim 7 wherein:
   (A) said heater control system includes (i) a source of electrical energy electrically connected to said heating means, and (ii) a thermostat responsive to predetermined temperature conditions to make and break electrical connection between said source of electrical energy and said heating means.

9. An arrangement according to claim 8 wherein:
   (A) said thermostat includes (i) a switch to make and break electrical connection between said source of electrical energy and said heating means, (ii) a controller having a first input for receiving a set point signal indicative of a desired seal housing temperature, and a second input for receiving an input signal indicative of actual seal housing temperature, and (iii) a circuit responsive to the difference between said signals to govern operation of said switch.

10. An arrangement according to claim 9 which includes:
    (A) at least two temperature sensors for providing signals indicative of seal housing temperature at respective spaced apart locations;
    (B) a decision circuit responsive to said signals provided by said at least two temperature sensors for generating a signal which is applied to said second input of said controller.

11. A method of starting up a turbine that permits a tighter seal between a seal housing, connected to a stationary portion of the turbine in a manner that permits the seal housing to grow thermally, independently of said stationary portion of said turbine, and a rotor in an interstage sealing arrangement comprising the steps of:
    (A) directly heating the seal housing over a substantially circumference of the seal housing, independent of rotation of the rotor, with a heating means prior to rotation of the rotor at a speed that would create meaningful radial growth of the rotor;
    (B) increasing the speed of rotation of the rotor after the seal housing rises above a given temperature or after the passage of a given period of time measured from when the heating step commences.

12. The method of starting a turbine of claim 11 including the step of turning off the heating means when the seal housing rises above a given temperature.

* * * * *